Sept. 26, 1944.  H. C. MYERS  2,359,144
VAPOR ELECTRIC DEVICE
Filed Aug. 8, 1942
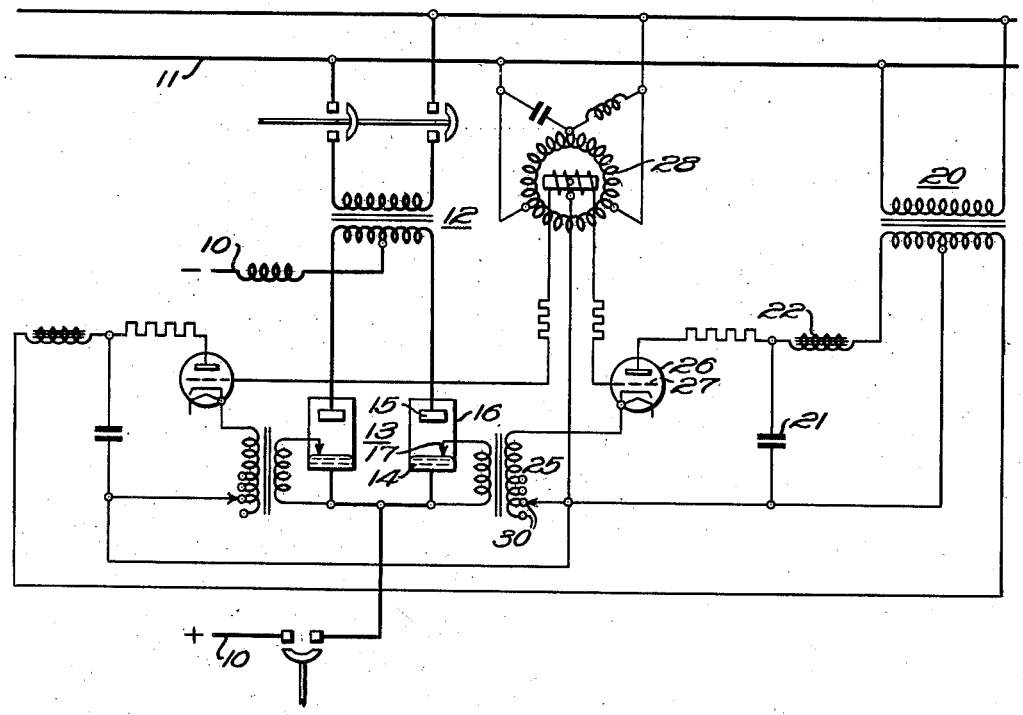
WITNESSES:
Robert C. Baird
James F. Young
INVENTOR
Henry C. Myers.
BY S. A. Stricklett
ATTORNEY Patented Sept. 26, 1944

2,359,144

UNITED STATES PATENT OFFICE 2,359,144

VAPOR-ELECTRIC DEVICE

Henry C. Myers, Irwin, Pa., assignor to Westinghouse Electric & Manufacturing Company, East Pittsburgh, Pa., a corporation of Pennsylvania Application August 8, 1942, Serial No. 454,159

1 Claim. (Cl. 315—206)

My invention relates to a vapor-electric device and, particularly, to an improved excitation system for a make-alive type valve.

It has heretofore been proposed to utilize a capacitor discharge for supplying a control impulse to the make-alive electrodes of a vapor-electric valve. Heretofore such capacitor firing circuits comprise a capacitor charged to a firing potential for approximately 250 to 300 volts and discharged through an auxiliary valve such as a thyratron. Because of the high peak current necessary in order to secure the necessary energy at the desired firing potential, the life of the firing tubes has been relatively short.

It is an object of my invention to provide the control circuit in which the duty on the firing tubes is materially decreased.

I secure this result by providing a high voltage circuit for charging a capacitor at a potential of the order of 800 to 1000 volts. The capacitor having this high potential is discharged through a firing tube in the normal manner instead of directly applying the potential to the make-alive electrode, it is first passed through a step-down firing transformer.

It is accordingly, an object of my invention to provide a coupling transformer for applying a potential to the make-alive electrode.

It is a further object of my invention to provide a capacitor firing circuit having long useful life.

Other objects and advantages of my invention will be apparent from the following description taken in conjunction with the accompanying drawing, in which the figure is a schematic illustration of a conversion system embodying my invention.

In the exemplary embodiment of my invention according to the figure, a direct-current circuit 10 is connected to an alternating-current circuit 11 by means of a suitable transformer device 12, and the flow of current through the transformer 12 is controlled by a plurality of vapor electric valves 13, each of said valves 13 comprising a vaporizable reconstructing cathode 14 of suitable material, such as mercury, and a cooperating anode 15 enclosed within an evacuated container 16. A make-alive electrode 17 is positioned in contact with the cathode 14.

Firing potential is supplied from a suitable source such as a transformer 20 energized from the alternating-current circuit 11. The firing capacitor 21 is charged from the transformer 20 through a suitable impedance such as a reactor 22. Preferably the charging potential of the capacitor 21 is of the order of 1000 volts. The firing capacitor 21 is connected to the make-alive electrode 17 by means of a coupling transformer 25 which reduces the firing potential to a potential of the order of 250 to 300 volts.

Control of the impulse is obtained by means of a suitable grid controlled firing tube 26. The grid 27 of the firing tube 26 may be controlled in any manner such as by a phase shifting transformer 28. By utilizing a high potential system coupled through a step-down transformer 25 to the make-alive electrode 17, it is possible to greatly reduce the peak current through the firing tube 26 and thus materially increase the useful life and improve the reliability of the control circuit. If desired, the coupling transformer 25 may be provided with a plurality of taps 30 for changing the firing potential supplied to the make-alive electrode 17 to compensate for certain variations in the make-alive electrodes 17.

While for purposes of illustration, I have shown and described a specific embodiment of my invention, it will be apparent that changes and modifications can be made therein without departing from the true spirit of my invention and the scope of the appended claim.

I claim as my invention:

A vapor electric device comprising a main anode and cathode in an evacuated container, a make-alive electrode in contact with said cathode, said make-alive electrode requiring an operating potential of the order of 300 volts, a source of exciting current having a potential of the order of 1000 volts, a capacitor, circuit means for charging said capacitor from said source to a potential of substantially the same order as the potential of the source, circuit means including the primary winding of a step down transformer for discharging said capacitor to produce a current impulse and circuit means including the secondary winding of said transformer for impressing said impulse on said make-alive electrode, and means for varying the output potential of said transformer to match the requirements of said make-alive electrode.

HENRY C. MYERS.